United States Patent Office 3,531,248
Patented Sept. 29, 1970

3,531,248
FORMING GRAPHITIC MATERIAL FROM FURFURYL ALCOHOL CATALYZED WITH ZIRCONYL NITRATE
Haskell Sheinberg, Los Alamos, N. Mex., assignor to the United States of America as represented by the United States Atomic Energy Commission
No Drawing. Filed Apr. 3, 1968, Ser. No. 718,351
Int. Cl. C01b 31/04
U.S. Cl. 23—209.1      1 Claim

ABSTRACT OF THE DISCLOSURE

Catalyzing furfuryl alcohol with zirconyl nitrate followed by thermal treatment to about a temperature of 2500° C. yields graphitic material.

---

The invention described herein was made in the course of, or under, a contract with the U.S. Atomic Energy Commission.

The present invention relates to an improved method of making graphitic material wherein the starting material is an aqueous solution of zirconyl nitrate which is added to furfuryl alcohol, and results in a graphitic material after being treated using any well known curing, baking, and graphitizing procedure. In the prior art, especially U.S. Pat. 3,107,153, a fine particle carbon aggregate in combination with a binder of furfuryl alcohol is used, while in U.S. Pat. No. 3,089,195 a method of producing a graphite article by mixing carbon powder with a thermo-setting furfuryl resin binder is described. Both of these patents are directed to using organic acids while the present invention is restricted to an inorganic catalyst, zirconyl nitrate.

In addition to these two references, U.S. Pat. No. 3,124,625, issued to Haskell Sheinberg, states that uranyl nitrate hexahydrate may be added to furfuryl alcohol for use as a binder in producing graphite. In general, the prior art was concerned primarily with catalyzing furfuryl alcohol with conventional material such as maleic anhydride followed by a thermal treatment; however, this procedure yielded an amorphous carbon whereas the present invention is concerned with a method that yields a graphitic material. The graphitic material of this invention has better thermal and electrical conductivity characteristics and the strength will be better than most of the previous graphites of the prior art.

This invention is directed to the addition of an aqueous solution of zirconyl nitrate to commercial furfuryl alcohol, heating the said solution for an extended period of time to about 250° C., further heating to a temperature of about 850° C. (the baking cycle), and then finally a graphitizing cycle which consists of heating from room temperature to 2500° C.

It is therefore an object of this invention to provide a process by which furfuryl alcohol may be transformed to a graphitic article.

This and other objects, features, and advantages of my invention will become apparent to those skilled in this particular art from the description to follow.

Two grams of zirconyl nitrate are dissolved in 5.5 grams of hot water. The aqueous solution is added to 26.5 grams of commercial furfuryl alcohol. The curing cycle consists of heating from room temperature to 250° C. in 63 hours with no hold at 250° C. The baking cycle consists of heating from 200° C. to 850° C. in approximately 40 hours with no hold at 850° C. The graphitizing cycle consists of heating from room temperature to 2500° C. in approximately 4 hours with a one-half hour hold at 2500° C.

Graphitic articles produced in accordance with the invention are equal in mechanical strength and have a lower electrical resistivity than prior art graphitic articles. Furthermore, the graphitic structure produced in accordance with the novel process is superior to that produced by prior art methods. Of course, many modifications will occur without departing from the novel concept of this invention. Although the preferred embodiment has been limited to the use of zirconyl nitrate as a catalyst, it would be within the scope of this invention to substitute either uranyl nitrate or titanyl nitrate.

What I claim is:
1. A method of forming a graphitic material which comprises adding an aqueous solution of zirconyl nitrate to furfuryl alcohol, curing, baking, and thereafter graphitizing at a temperature of about 2500° C.

References Cited
UNITED STATES PATENTS

| | | | |
|---|---|---|---|
| 2,570,027 | 10/1951 | Dunlop et al. | 260—88.5 |
| 3,089,195 | 5/1963 | Woodburn | 264—29 |
| 3,124,625 | 3/1964 | Sheinberg et al. | 264—29 X |
| 3,201,330 | 8/1965 | Price | 23—209.1 X |
| 3,342,910 | 9/1967 | Ishihara et al. | 264—29 X |

OTHER REFERENCES

Yokokawa et al. "Carbon," vol. 4, 1966, pp. 459–465.
Dollimore et al. "Carbon," vol. 5, 1967, pp. 65–72.

EDWARD J. MEROS, Primary Examiner

U.S. Cl. X.R.
264—29